United States Patent
Baracca et al.

(10) Patent No.: US 11,994,167 B2
(45) Date of Patent: May 28, 2024

(54) REINFORCED CASING FOR FOOD APPLICATIONS

(71) Applicant: AKTIEBOLAGET SKF, Gothenburg (SE)

(72) Inventors: Fausto Baracca, Massa (IT); Alessio Nebbia Colomba, Pisa (IT); Andrea A Bertolini, Carrara (IT); Fabio Cavacece, Rome (IT)

(73) Assignee: AKTIEBOLAGET SKF (SE)

( * ) Notice: Subject to any disclaimer, the term of this patent is extended or adjusted under 35 U.S.C. 154(b) by 0 days.

(21) Appl. No.: 18/212,226

(22) Filed: Jun. 21, 2023

(65) Prior Publication Data
US 2023/0340997 A1  Oct. 26, 2023

Related U.S. Application Data

(63) Continuation of application No. 17/588,298, filed on Jan. 30, 2022, now Pat. No. 11,732,756.

(30) Foreign Application Priority Data

Feb. 3, 2021 (IT) .......................... 102021000002192

(51) Int. Cl.
*F16C 35/04* (2006.01)
*F16C 23/08* (2006.01)

(52) U.S. Cl.
CPC .......... *F16C 35/045* (2013.01); *F16C 23/084* (2013.01); *F16C 2204/60* (2013.01); *F16C 2208/00* (2013.01); *F16C 2220/04* (2013.01)

(58) Field of Classification Search
CPC ...... F16C 23/082; F16C 23/084; F16C 35/02; F16C 35/042; F16C 35/045
See application file for complete search history.

(56) References Cited

U.S. PATENT DOCUMENTS

| | | | |
|---|---|---|---|
| 4,565,493 A | 1/1986 | Hallerback | |
| 10,385,923 B2 | 8/2019 | Falaschi et al. | |
| 11,578,801 B2 * | 2/2023 | Baracca | ................ F16C 33/723 |
| 11,867,233 B2 * | 1/2024 | Baracca | ................ F16C 33/7886 |
| 2018/0045248 A1 | 2/2018 | Falaschi et al. | |
| 2020/0124089 A1 | 4/2020 | Sarlin | |

FOREIGN PATENT DOCUMENTS

| | | |
|---|---|---|
| EP | 0487476 | 5/1992 |
| FR | 2696217 | 4/1994 |

OTHER PUBLICATIONS

Search Report for corresponding Italian Patent Application No. 102021000002191 dated Sep. 24, 2021.

* cited by examiner

*Primary Examiner* — James Pilkington
(74) *Attorney, Agent, or Firm* — Reed Smith LLP

(57) ABSTRACT

Casing of a bearing unit for food applications, made of polymeric material and provided internally with a spherical seat for housing the bearing unit, the casing having a reinforcement in the form of a metal ring co-molded inside the casing and accommodated around the spherical seat of the casing.

11 Claims, 1 Drawing Sheet

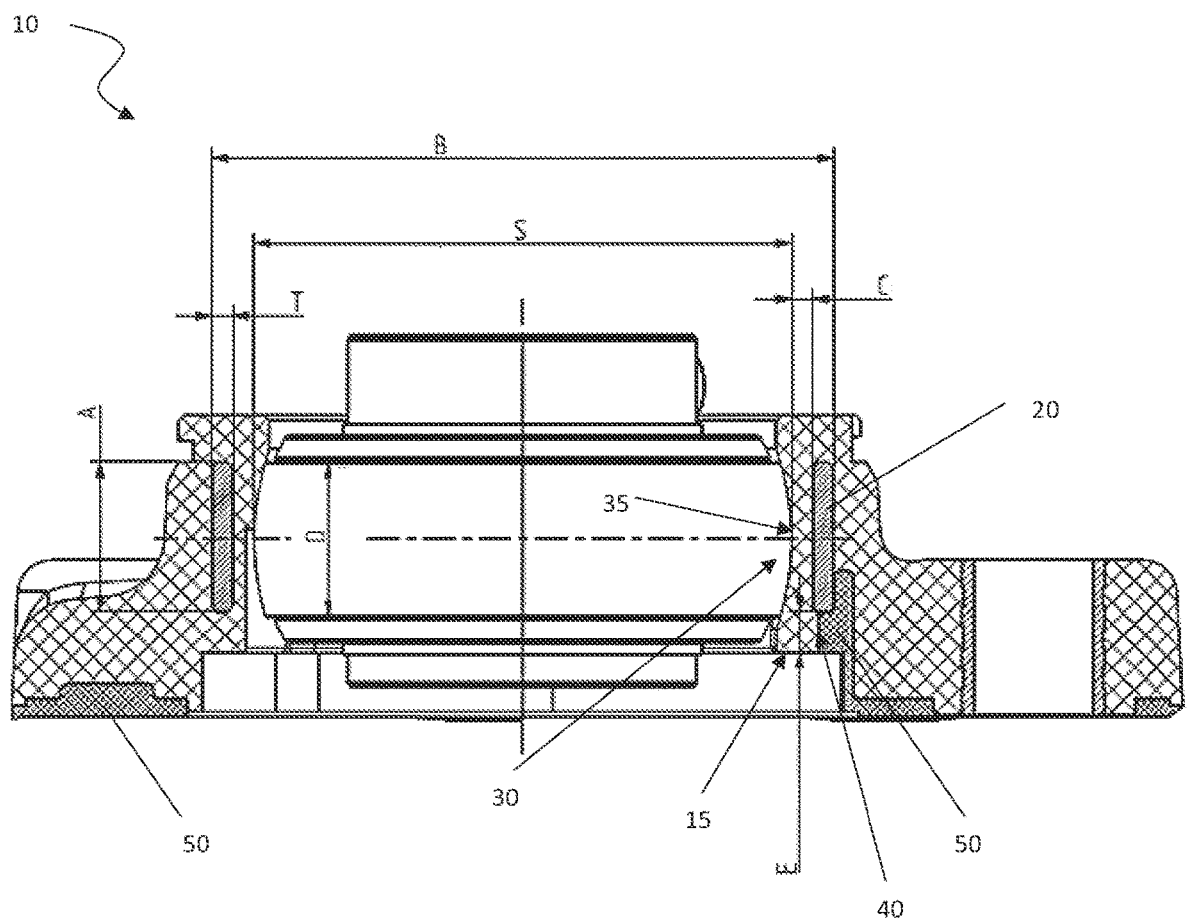

REINFORCED CASING FOR FOOD APPLICATIONS

CROSS-REFERENCE TO RELATED APPLICATIONS

This application is a continuation of application Ser. No. 17/588,298 filed on Jan. 30, 2022 which claims priority to Italian Patent Application No. 102021000002192 filed on Feb. 3, 2021, under 35 U.S.C. § 119, the disclosure of which is incorporated by reference herein.

FIELD

The present disclosure relates to a reinforced casing for food applications.

BACKGROUND

As is known in the F & B (Food and Beverages) industry, efforts are being increasingly directed towards developing new machines and machine designs aimed at improving the safety and quality of foods.

A typical component of these applications is a casing, e.g., for a bearing unit, generally but not exclusively, made of polymeric material compatible with food applications.

BRIEF DESCRIPTION OF THE DRAWINGS

Various exemplary embodiments are described herein with reference to the accompanying drawing, in which:

FIG. 1 is a cross-section through a reinforced casing, preferably, but not solely, for use in food applications in accordance with this disclosure.

DETAILED DESCRIPTION

A casing is provided with a spherical seat which houses internally a bearing unit (in the F & B sector often called "Y-bearing units"), which in turn allow rotation of a rotating machine shaft with respect to a casing which is often a static component fastened to a machine frame.

Generally, a design strength of a casing is equal to an admissible load acting on a bearing units: normally catalogues of commercial bearing units show a load value Co expressed in Newtons, which represents a design strength of a bearing unit.

It has become known that it is typical of end users of food application not to respect maximum load values indicated by a manufacturer. Moreover, it frequently is the case, especially during transportation operations, that sudden loads of an intensity which cannot be easily predefined impose stress upon a casing and often result in breakage thereof.

Attempts to reinforce a casing with an additional element which is co-molded together with the casing obtain a casing that is made of a composite material. An elastic means is used in such embodiments as reinforcement, for example a spiral spring. However, in known co-molding processes, an end product has a number of externally visible marks, i.e., pinholes or burring, where the elastic means has been inserted. Such defects are absolutely forbidden in food applications rendering such methods unusable for food applications.

There therefore exists a need for reinforced casings which offer a design solution able to overcome the aforementioned resultant drawbacks.

In various embodiments in accordance with this disclosure, a casing for a rotating shaft and associated bearing unit is fastened to a machine frame. In some exemplary embodiments, a reinforcement makes a casing resistant to higher loads and thereby prolongs its working life.

Purely by way of a non-limiting example and with reference to FIG. 1, a casing 10, reinforced, e.g., for food applications, is made of a polymeric material and is provided with a reinforcement consisting of a metal ring 20.

A ring 20 is co-molded (preferably by injection-molding) inside a casing 10 and is accommodated around a spherical seat 30 of casing 10. A bearing unit, of various types and for this reason not shown in the FIGURE, is housed inside this spherical seat. A ring 20 may be formed of stainless steel or galvanized steel. Since a ring 20 surrounds a spherical seat 30, the dimensions of a ring, as will be described below (namely diameter b, thickness t and width a) are calculated with reference to dimensions of a spherical seat 30 of casing 10.

A technical problem addressed by embodiments in accordance with this disclosure is that of ensuring, when co-molding a ring 20 inside a casing 10, that a ring 20 assumes a predetermined position inside such a mold and that this position does not change once the co-molding process has been completed, and that after removal of stops which position the ring precisely, no surface of a casing 10 is altered visibly in any way.

In order to obtain these results, a steel ring 20 is positioned precisely inside a mold by means of a plurality of special pins which act as stop elements. In various non-limiting embodiments, four stop elements are utilized. When a co-molding operation completes, with material of a casing, e.g., 10, (which may be a polypropylene or a polyamide, but also another polymeric material provided that it is compatible with food applications when intend for use in food applications), removal of such stop pins will obviously leave a plurality of holes 40 (for example four holes) inside the casing 10. In order to eliminate these marks, during a subsequent overmolding operation with elastomer material, elastomer material is made to penetrate also into such holes, e.g., 40 left by removal of stop pins. Elastomer blocks 50 improve adherence of a casing 10 when it is mounted on a machine frame. Elastomer material is utilized in order to form, in addition to blocks 50 along a base of a casing 10, but also a filling for holes, e.g., 40, which are left after removal of stop pins supporting a ring 20. Advantageously, elastomer material which also satisfies the function of flowing inside holes is a thermoplastic elastomer; however, different elastomer materials may also be used provided they flow in a suitable manner as will be appreciated upon a full reading of this disclosure. In accordance with these steps the dual aim of obtaining a predetermined position of a ring 20 inside a casing 10, while at the same time not leaving any visible marks on the surface of the said casing is achieved.

Dimensions of a ring 20 are preferably defined depending on dimensions of a spherical seat 30 for housing, e.g., a bearing unit. In particular, dimensions of a spherical seat 30 which are of importance are its diameter S and a height of outer ring D of a bearing unit housed in a spherical seat 30. Based on values of these dimensions, for a ring 20 made of steel it is possible to define dimensions of a metal ring 20.

Firstly, in order to ensure a good structural strength, in various embodiments, thickness T of a ring 20 is not less than 1 mm. Still for structural reasons, but also to ensure a good stability of a spherical seat 30, a width A in an axial direction of a ring 20 is not greater than 1 mm less than a height D of an outer ring of a bearing unit in the axial direction. In other words:

$$A \leq D-1 \text{ mm}$$

Moreover, the requirements of an injection-molding process are such that minimum thicknesses are needed in order for material to flow uniformly and without defects (for example swelling and bubble formation) inside a mold. Therefore a distance C of a ring 20 from a spherical surface 35 of a spherical seat 30 is not less than 1 mm. Likewise a distance E between a ring 20 and an outer surface 15 of a casing 10 is not less than 1 mm.

Using the dimensions thus defined, the outer diameter B of the steel ring is obtained from the following formula:

$$B=(S+2T+2C)$$

Where S, it is pointed out again, is the diameter of the spherical seat.

This solution may be applied to all the different existing forms of casings for food applications. In particular:
square-flange casings
oval-flange casings
flanged casings with three bolts
casing with upright support
casing with upright support and short base
And further other types.

In various certain embodiments, thickness T of a ring 20 must not be less than 1 mm. Width A of a ring 20 must not be not greater than a height D of an outer ring of a bearing unit less 1 millimetre. And, a distance C of a ring 20 from a spherical surface 35 of a spherical seat 30 must not be less than 1 mm. Likewise a distance E between a ring 20 and an outer surface 15 of a casing 10 must not be less than 1 mm.

Specific advantages of embodiments in accordance with this disclosure are that it provides a competitive advantage over known casing solutions and it improves the technical quality (reinforcement of the casing obtained by means of an elastic element) and thereby prolongs the working life a casing and a retained bearing unit. In food applications, a distinct advantage is a casing that meets requirements for food applications by having no facial defects.

From the first point of view, a novel solution for a bearing unit casing which is extremely strong and robust is obtained.

From the point of view of the internal technical quality, embodiments in accordance with this disclosure ensure a precise positioning of a reinforcing ring, while providing better results in terms of technical performance, namely, compared to known solutions, reducing the variation in performance due to the possible movement of the elastic element during a molding process. Moreover, use of a metal ring compared to known elastic elements improve overall strength of a resulting casing. Finally, an extremely important advantage is removal of superficial marks which were necessary for keeping elastic elements in position. These surface marks have proved to be major bacteria traps which compromise food safety in general.

In addition to embodiments described above, it must be understood that there exist numerous other variants. It must also be understood that these embodiments are only examples and do not limit the scope of this disclosure, nor its applications, nor its possible configurations. On the contrary, although the description above allows the person skilled in the art to implement embodiments in accordance herewith, it will be understood upon a full reading of this disclosure that many variants of the components described are possible.

In order to solve substantially technical problems discussed herein, an object of the present disclosure is to describe a reinforced casing for food applications. In various embodiments a casing for a rotating shaft and associated bearing unit is fastened to a machine frame. According an aspect of various embodiments, a casing is made of polymeric material and is provided with a reinforcement formed as a ring of metallic material. The casing itself is reinforced by adding a metal ring co-molded around the spherical seat inside which a bearing unit is housed and thereby improves a breakage load, improves its rigidity and improves its resistance test performance all of which works to increase the working life of the casing.

Embodiments of a casing in accordance with this disclosure have improved mechanical strength over known casings by means reinforcing rings in accordance with this disclosure. Moreover, embodiments are resistant to marks being formed on surfaces of a casing.

According to another aspect, dimensions of a metal ring are based exclusively on a design of a spherical seat of exemplary casings inside which a bearing unit is housed.

We claim:

1. A casing made of a polymeric material comprising:
the polymeric material defining one or more holes;
the polymeric material further defining a spherical seat comprising an axis of symmetry;
an elastomeric material disposed within at least one of the one or more holes;
a reinforcement ring disposed within the polymeric material, the reinforcement ring being substantially co-axial with the spherical seat,
wherein the elastomeric material extends radially along an outer surface of a base of the casing and also extends axially from the base of the casing to at least the reinforcing ring.

2. The casing of claim 1, wherein the reinforcement ring is made of metal.

3. The casing of claim 2, wherein the reinforcement ring is made of stainless steel or galvanized steel.

4. The casing of claim 2, wherein the reinforcement ring is co-molded inside the casing.

5. The casing of claim 4, wherein the one or more holes are defined in the casing as a result of removing pins that supported the reinforcing ring during co-molding of the reinforcing ring.

6. The casing of claim 1, wherein a thickness (T) of the reinforcement ring is not less than 1 mm.

7. The casing of claim 1, wherein the spherical seat is configured for housing a bearing unit.

8. The casing of claim 7, wherein a width (A) in an axial direction of the reinforcement ring is not greater than 1 mm less than a height (D) of a radially outer ring of the bearing unit.

9. The casing of claim 1, wherein a distance (C) of the reinforcement ring from a spherical surface of the spherical seat is not less than 1 mm.

10. The casing of claim 1, wherein the distance (E) of the reinforcement ring from an external surface of the casing is not less than 1 mm.

11. The casing of claim 1, wherein an outer diameter (B) of the reinforcement ring is obtained from the following formula:

$$B=(S+2T+2C)$$

wherein S is a maximum diameter of the spherical seat, T is a thickness of the reinforcement metal ring, and C is a distance of the reinforcement metal ring from a spherical surface of the spherical seat.

* * * * *